March 1, 1966 A. B. NEWTON 3,237,415
ZONE CONTROLLED REFRIGERATION SYSTEM
Filed Dec. 31, 1964
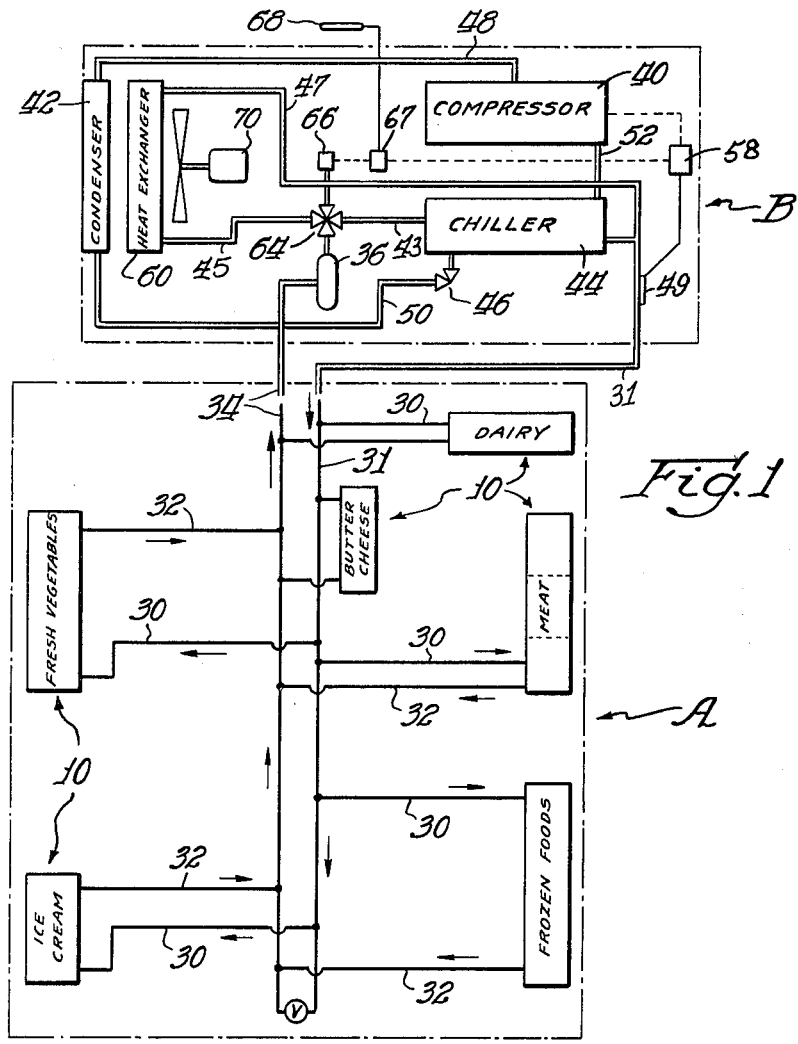
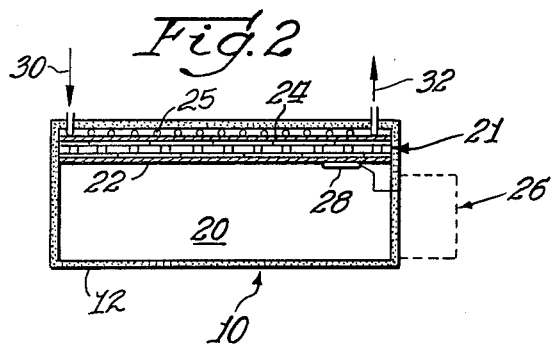
Inventor:
Alwin B. Newton
By: Thomas B. Hunter Atty.

United States Patent Office 3,237,415
Patented Mar. 1, 1966

3,237,415
ZONE CONTROLLED REFRIGERATION SYSTEM
Alwin B. Newton, York, Pa., assignor to Borg-Warner Corporation, Chicago, Ill., a corporation of Illinois
Filed Dec. 31, 1964, Ser. No. 422,577
14 Claims. (Cl. 62—3)

This invention relates generally to refrigeration systems, and more particularly to an improved thermoelectric refrigeration system especially adapted for use in retail food markets and similar applications which require that a plurality of individual cooling zones be maintained at different temperatures.

In the conventional refrigeration system used for the temporary storage of various comestibles such as meat, dairy products, frozen foods, ice cream and fresh produce, there is a requirement that each individual storage unit, ordinarily a display case or locker of one type or another, be maintained below some critical temperature, and often within a relatively narrow range of temperatures to prolong freshness and prevent spoilage of the stored food. Optimum storage temperatures for different classes of food products vary considerably. For example, ice cream and related products are required to be maintained at a temperature below −12° F., while frozen foods may be safely kept at 0° F. Fresh meat, on the other hand requires a temperature range which has upper and lower limits, viz. between 28° and 36° F. Similarly, fresh produce should be held within about the same temperature range while dairy products are preferably maintained between 35° and 42° F. Even within an individual display case it is desirable to keep certain products, such as cured bacon at a temperature somewhat above the optimum temperature required for fresh meat.

The conditions stated above, in addition to others peculiar to the retail food store and analogous applications, create a number of problems in refrigeration system construction, particularly with regard to the close temperature control demanded and economy of operation. In the typical system of the prior art, each of the display cases is either provided with a separate refrigeration unit which is independently controlled by temperature responsive means within the cabinet, or they are refrigerated by a central system which circulates a chilled brine at the lowest temperature required within an individual case. Temperature control in this type of system is achieved by means for varying the flow of air over the cooling coil in each of the display cases. The piping system for the latter arrangement is usually quite expensive since the lines must be properly insulated to reduce losses.

Briefly stated, the present invention utilizes one or more thermoelectric cold producing units associated with each of the individual display cases and means for controlling the temperature of the storage zone in each case by varying the direct current supplied to the thermoelectric units. Inasmuch as the operation of a thermoelectric cooling unit is uneconomical when the temperature differential between the sink and load sides of the unit is too high, a separate refrigeration system, which may comprise a conventional compressor-condenser-evaporator circuit, is provided for chilling the heat exchange medium, e.g. a brine, which is supplied to the heat rejection or sink sides of each of the thermoelectric units. The invention further includes control means responsive to ambient temperatures for automatically and selectively flowing the heat exchange medium either through the evaporator chiller or through a second heat exchanger, preferably mounted outside the building, over which outside ambient air is caused to flow. This permits operation of the refrigeration system in an economical manner when the outdoor temperatures are low enough to cool the brine to the desired sink side temperature without the use of the refrigeration unit.

It is therefore a principal object of the present invention to provide an improved refrigeration system which affords better individual control over the temperatures required in various cooling zones.

Another object of the invention is to provide a refrigeration system adapted for use in a retail food market or the like, using thermoelectric cold producing units in the display cases, and a means outside the display case area for cooling the heat exchange medium while at the same time avoiding the problems associated with the low outside ambient temperature conditions.

Additional objects and advantages will be apparent from a reading of the following detailed description taken in conjunction with the drawings wherein:

FIGURE 1 is a schematic representation of a refrigeration system constructed in accordance with the principles of the present invention; and FIGURE 2 is a more detailed, schematic illustration of one of the refrigerated food display cases.

Referring first to FIGURE 1, a partial floor plan for a typical retail food market is illustrated in diagrammatic form, and indicated by reference character A. Within the building or other type of enclosure there are a plurality of display cases or lockers 10 arranged on the floor space devoted to the display of food. Preferably located on the outside of the building are means, designated generally at B, for chilling a heat exchange medium which is supplied to the heat rejection side of the individually controlled thermoelectric cold producing units 21 (FIGURE 2) in each of the display cases. A circuit for recirculating the heat exchange medium, preferably a brine, between the chilling means B and the display cases is provided in the form of a conduit network to be described in greater detail below.

Referring now to FIGURE 2, each of the display cases 10 comprises a casing or housing 12, preferably insulated, which defines a refrigerated zone or space 20 for the storage of food internally thereof. Associated with each of the cases is at least one thermoelectric unit 21 having a heat abstraction or load side in heat exchange relation with the storage space 20, and heat rejection or sink side 24 in heat exchange relation with a heat exchange coil 25 through which the heat exchange medium flows. Some of the display cases, such as the meat case, may be divided into two or more sections (indicated by dotted lines), each of which has its own independently controlled thermoelectric unit. This allows several different types of products, for example, cured, fresh and frozen meats, to be stored in the same case and still be kept at their respective optimum temperatures.

Thermoelectric units 21 are constructed of alternating p and n-type semi-conductor elements and may be of the type shown generally (but used in a different application) in U.S. Patent 3,126,710, issued to A. P. Boehmer on March 31, 1964. It will be appreciated that thermoelectric units of this type are actually reversible heat pumping devices which are adapted to abstract or reject heat to either side, depending on which direction the unidirectional current flows through the p and n-semiconductor elements. Inasmuch as the present invention is concerned with a refrigeration system, the units 21 will be regarded primarily as thermoelectric cold producers, although in some situations, such as defrosting operations, they might well be employed as heating elements either by reversing the direction of current or by supplying A.C. electrical energy thereto and using them as resistance heaters. Consequently, the load side will be defined as the one in thermal relation with the storage zone and the sink side will be defined as the side being in thermal relation with the heat exchange medium supplied from the chilling means B. The heat rejection side will be synonomous with the sink side and the heat abstraction side will be synonomous with the load side, insofar as the thermoelectric units are regarded as cold producers.

The control of the temperature within each of the individual display cases, in the broadest sense, is effected by means 26 for varying the heat pumping capacity of the thermoelectric units in response to an error signal provided by a temperature responsive element 28 sensing the temperature of the air in the storage zone. The heat pumping capacity of the thermoelectric units is, of course, controlled by varying the unidirectional current supplied to the semi-conductor elements in the thermoelectric unit. In a more sophisticated control system, this may involve the use of infinitely variable power supply, such as a Variac or a solid state voltage control, which is responsive to both the overall load conditions and the temperature within the controlled zone. This type of system is described in applicant's copending application, Serial No. 229,945, filed October 11, 1962. However, in a preferred embodiment, adequate control may be achieved by using a two tap A.C. transformer in combination with an A.C. to D.C. converter and temperature responsive means for switching the output between a first tap wherein full output voltage is supplied to the converter and a second tap wherein only sufficient voltage is supplied to compensate for normal heat transfer into the display case. This latter arrangement is preferred to a simple on-off thermostat for more economical operation of the thermoelectric units.

The circuit for the heat exchange medium circulated to the heat rejection side of the thermoelectric units, hereinafter referred to as the brine, comprises a pump 36 and a plurality of conduits interconnecting the brine chilling means B with each of the cases in the display area A. Chilled brine flows from the chilling means B through a supply header 31 which is interconnected to a plurality of individual supply lines 30 servicing each of the thermoelectric units. The brine then flows through each of the heat exchange coils 25 in heat exchange relation with the heat rejection side of the thermoelectric units and is recirculated back to the chilling means B through individual return lines 32, common return header 34, and pump 36. Suitable valves, one of which is shown at V may be employed to bypass the brine if a unit is not in use or in the event that flow through a heat exchange coil or other line is obstructed.

The brine chilling means B, in a preferred embodiment, comprises a conventional refrigeration unit including a compressor 40, a condenser 42 and an evaporator, a first heat exchanger (not shown) associated with said evaporator to provide a chiller 44, and a second heat exchanger 60 over which ambient air is caused to flow, said second heat exchanger 60 being connected in parallel with said refrigeration unit chiller 44. When ambient temperatures are high enough to require operation of the refrigeration unit, the compressor 40 forwards compressed refrigerant vapor through line 48 to the condenser 42. The condensend liquid refrigerant flows through line 50, containing an expansion valve 46, to the evaporator coil in chiller 44, and from there the refrigerant vapor flows through line 51 back to the suction side of the compressor. Refrigeration capacity control is provided by means 58 in any conventional manner.

An important aspect of the present invention concerns means for selectively and alternately directing brine to be chilled either through the first heat exchanger, i.e. chiller 44, or through the second heat exchanger 60, depending on the outside ambient air temperature. This selectively operated flow directing means comprises a three way valve means 64 receiving brine from the discharge side of circulation pump 36 and a valve actuating means 66 operated by a temperature responsive control means 67 having a capillary bulb 68 or some equivalent means for sensing the outside ambient air temperature.

The brine chiller B is adapted to maintain the temperature of the brine at approximately 50° F., so as to limit the maximum temperature difference between the sink and load sides of the thermoelectric units while satisfying the display case temperature requirements which range from a minimum temperature below −12° F. for ice cream up to 50° F. for the fresh produce. When the outside ambient air temperature is below approximately 45° F., flow may be switched to the air-to-brine heat exchanger 60 and the operation of the refrigeration unit discontinued.

*Operation*

During operation of the system, when the outside ambient air temperature is above approximately 45° F., valve actuating means 66, operated by temperature controller 67, will set the three way valve 64 so that the brine flows from pump 36 through line 43 through the heat exchanger (refrigerant to brine) associated with chiller 44, and back to the thermoelectric units through header 31 and line 30. The heat rejected at the thermoelectric units is absorbed by the brine flowing through coils 25, and the brine flows back to pump 36 through lines 32 and header 34. During this period of operation, the temperature of the brine is maintained at approximately 50° F. by the refrigeration unit capacity control means 58 which is responsive to a sensing element 49 in thermal contact with the brine being forwarded to the thermoelectric units.

When the outside ambient air temperature drops below the predetermined changeover point (approximately 45° F.), temperature responsive control 67 is adapted to operate valve actuator 66 which in turn, changes the position of valve 64 to divert the flow of brine from line 43 to line 45, leading to the air-to-brine heat exchanger 60. Brine then flows from heat exchanger 60 through line 47, which connects with supply header 31. At the same time valve 64 is actuated, the temperature responsive control 67, operating on capacity control means 58, discontinues operation of the refrigeration unit. Fan means 70, which is adapted to circulate air over both condenser 42 and heat exchanger 60, may also be controlled by the temperature of the brine being returned to the load during this low ambient phase of operation. When very low outside ambient temperatures are encountered, a bypass line and temperature responsive valve means may be provided to selectively bypass a portion of the brine around the chilling means B.

While this invention has been described in connection with a certain specific embodiment thereof, it is to be understood that this is by way of illustration and not by way of limitation; and the scope of this invention is defined solely by the appended claims which should be construed as broadly as the prior art will permit.

What is claimed is:

1. In apparatus of the character described, the combination comprising thermoelectric cold producing means having a heat abstraction side and a heat rejection side; means for circulating a heat exchange medium in heat exchange relation with the heat rejection side of said thermoelectric cold producing means; means for chilling said heat exchange medium, said means comprising a refrigeration unit including a compressor, a condenser and an evaporator connected in closed, refrigerant flow relation, a first heat exchanger associated with said evaporator, and a second heat exchanger in heat exchange relation with ambient air; and valve means for selectively flowing said heat exchange medium through said first or said second heat exchanger prior to being circulated to said thermoelectric cold producing means.

2. Apparatus as defined in claim 1 including valve actuating means operatively associated with said valve means, said valve actuating means being operated in response to the temperature of said ambient air.

3. Apparatus as defined in claim 2, including means responsive to the temperature of said heat exchange medium being circulated to said thermoelectric cold producing means to vary the refrigeration capacity of said compressor.

4. Apparatus as defined in claim 3 including ambient temperature responsive control means operating said valve actuating means, said control means being also operative to discontinue operation of said refrigeration unit when said valve is moved to a position whereby said heat exchange medium flows through said second heat exchanger.

5. Apparatus as defined in claim 1 including means for supplying unidirectional electrical energy to said thermoelectric cold producing means; and temperature responsive means for varying the electrical energy supplied to said thermoelectric cold producing means.

6. In apparatus of the character described, the combination comprising means defining plurality of zones to be refrigerated; at least one thermoelectric cold producing means operatively associated with each of said zones having a heat rejection side; and a heat abstraction side in thermal communication with each of said zones; heat exchange medium chilling means comprising a refrigeration unit including a compressor, a condenser, and an evaporator connected in closed, refrigerant flow relation, a first heat exchanger associated with said evaporator, and a second, air-to-liquid, heat exchanger in heat exchange relation with outside ambient air; means for circulating a liquid heat exchange medium in a closed circuit between said chilling means and each of the heat rejection sides of said thermoelectric cold producing means; and valve means for selectively flowing said medium through said first or second heat exchangers.

7. Apparatus as defined in claim 6 including valve actuating means operatively associated with said valve means, said valve actuating means being operated in response to the temperature of said ambient air.

8. Apparatus as defined in claim 7 including means responsive to the temperature of said heat exchange medium being circulated to said thermoelectric cold producing means to vary the refrigeration capacity of said compressor.

9. Apparatus as defined in claim 8 including ambient temperature responsive control means operating said valve actuating means, said control means being also operative to discontinue operation of said refrigeration unit when said valve is moved to a position whereby said heat exchange medium flows through said second heat exchanger.

10. Apparatus as defined in claim 6 including means for supplying unidirectional electrical energy to said thermoelectric cold producing means; and temperature responsive means for varying the electrical energy supplied to said thermoelectric cold producing means.

11. In apparatus of the character described, the combination comprising a plurality of food display cases, each having means defining a storage space for food, and wherein at least some of said storage spaces require different temperatures to be maintained therein; at least one thermoelectric cold producing means operatively associated with each of said display cases, said means having a heat rejection side, and a heat abstraction side in thermal communication with said storage space; a first heat exchanger in thermal communication with said heat rejection side; liquid heat exchange medium chilling means comprising a refrigeration unit including a compressor, a condenser and an evaporator connected in closed, refrigerant flow relation, a second heat exchanger associated with said evaporator, and a third heat exchanger in heat exchange relation with ambient air, said third heat exchanger being connected in parallel flow relation with said second heat exchanger; a heat exchange medium distribution circuit including a pump and associated conduits for circulating said heat exchange medium in closed circuit flow between said chilling means and each of said first heat exchangers associated with the heat rejection side of said thermoelectric cold producing means; and valve means in said heat exchanger medium distribution circuit for selectively flowing said heat exchange medium through said first and said second heat exchanger.

12. Apparatus as defined in claim 11 wherein at least some of said display cases include a plurality of independent thermoelectric cold producing means; and temperature responsive means associated with each of said thermoelectric means for independently controlling the heat pumping capacity thereof.

13. Apparatus as defined in claim 12 including means responsive to the temperature of said heat exchange medium being circulated to said thermoelectric cold producing means to vary the refrigeration capacity of said compressor.

14. Apparatus as defined in claim 13 including ambient temperature responsive control means operating said valve actuating means, said control means being also operative to discontinue operation of said refrigeration unit when said valve is moved to a position whereby said heat exchange medium flows through said second heat exchanger.

References Cited by the Examiner

UNITED STATES PATENTS

| | | | |
|---|---|---|---|
| 2,837,899 | 6/1958 | Lindenblad | 62—3 |
| 3,111,813 | 11/1963 | Blumentritt | 62—3 |
| 3,127,928 | 4/1964 | Ringquist | 62—435 |
| 3,176,472 | 4/1965 | Cox | 62—3 |

WILLIAM J. WYE, *Primary Examiner.*